April 21, 1970   R. A. CLIFF   3,508,039
APPARATUS FOR COMPUTING SQUARE ROOTS

Filed Nov. 30, 1966  2 Sheets-Sheet 1

INVENTOR
Rodger A. Cliff

BY
ATTORNEYS

April 21, 1970 R. A. CLIFF 3,508,039
APPARATUS FOR COMPUTING SQUARE ROOTS
Filed Nov. 30, 1966 2 Sheets-Sheet 2

INVENTOR
Rodger A. Cliff

BY
ATTORNEYS

United States Patent Office 3,508,039
Patented Apr. 21, 1970

3,508,039
APPARATUS FOR COMPUTING SQUARE ROOTS
Rodger A. Cliff, College Park, Md., assignor to the United States of America as represented by the Administrator of the National Aeronautics and Space Administration
Filed Nov. 30, 1966, Ser. No. 598,119
Int. Cl. G06f 7/38
U.S. Cl. 235—158                    6 Claims

ABSTRACT OF THE DISCLOSURE

Apparatus for obtaining a square root of a number wherein two binary registers are selectively interconnected by gates so that a numerical progression is subtracted from one register which contains a number the square root of which is desired.

---

The invention described herein was made by an employee of the United States Government and may be manufactured and used by or for the Government for governmental purposes without the payment of any royalty thereon or therefor.

The necessity for determining the square root of numbers is well known. For many numbers the square root obtained from a table of square roots or from mathematical computations is an approximation of the exact square root of the number. The closeness of the approximation is determined by the use to which the square root is to be put. In many situations an approximation to the nearest integer is satisfactory; this invention is concerned with such an approximation. That is, this invention provides apparatus for approximating the square root of a number to the nearest integer.

The prior art has utilized various methods and apparatus for obtaining the square root of numbers. Analog methods, combinational logic matrix methods, and Newton approximation methods have been used. However, these approaches have not always been entirely satisfactory. In general, the methods are complicated and the apparatus for carrying out the methods are equally complicated. In addition, prior art apparatus uses additional components to obtain the square root of a number, thereby adding to the possibility of computer system failure. Further, the addition of components increases the size and weight of the computer; and the addition of components adds to the power used by the computer. In many environments increased power consumption, reduced reliability, added components, and added weight and size are undesirable; in other environments they are critically undesirable. Specifically, when a computer is located on board a spacecraft—or in other remote environments—these items become critical to the operation of the craft. In fact, generally speaking, any system that uses more than the minimum number of components is less than the most desirable system for use on a spacecraft. Hence, because spacecraft computers must obtain the square root of numbers to perform certain calculations, it is desirable to provide a method and apparatus for taking the square root of a number that uses less power and fewer components, is lighter and smaller, and is more reliable than prior art devices.

It is an object of this invention to provide a new apparatus for computing the square root of a number.

It is also an object of this invention to provide a new and improved apparatus for obtaining the square root of a number to the nearest integer which does not require the use of a separate system for obtaining the square root.

It is a still further object of this invention to provide a new and improved apparatus for obtaining the square rooot of a number that is simple and uncomplicated, small and lightweight and reliable.

While the peculiar advantages of the apparatus of the invention as hereinafter described make the invention primarily suitable for use on a spacecraft, the invention is more general and is useful in determining the square root of numbers in earthbound electronic systems as well.

In accordance with a principle of the invention, the apparatus accomplishes the results by sequentially subtracting a numerical progression of numbers from a number whose square root is desired; detecting when the result of the sequential subtractions is one of a set of predetermined numbers (for example either zero or a negative number); and counting the number of subtractions that have taken place when one of the set of predetermined numbers (for example zero or a negative number) is reached. The number of subtractions is equal to the square root of the number to the nearest integer.

In accordance with a further principle of the invention an exemplary apparatus comprises two binary counting means, a coupling means, and pulse inhibiting means. The first binary counting means counts in a forward direction and the second binary counting means counts in a backward direction. The stages of the forward counting means are selectively coupled to the stages of the backward counting means through the coupling means so that the number in the forward counting means can be subtracted from the number in the backward counting means in a predetermined manner. Finally, the inhibit means is connected to the forward and backward counting means, the coupling means, and a pulse source so that it passes pulses from the pulse source to the forward counting means until the number in the backward counting means becomes either zero or a negative number.

In operation, the number whose square root is desired is inserted into the backward counting means. The forward counting means is cleared and pulses are applied to both it and the coupling means. When the first pulse is applied the forward counting means generates an output. The output passes through the coupling means and causes a subtraction from the backward counting means. The number subtracted is equal to the first number in the numerical progression determined by the method of the invention. When the second pulse is applied, the forward counting means generates a second output. This second output passes through the coupling means and causes a subtraction of the second number in the numerical progression from the backward counter. This subtraction of the next number in the progression continues to occur for each subsequent input pulse until the number in the backward counting means equals either zero or a negative number. When the zero or negative number condition occurs the inhibit means prevents the further application of pulses. And, in accordance with the method of the invention, the number of pulses counted by the forward counting means is equal to the square root of the number originally in the backward counter to the nearest integer.

It will be appreciated that the invention provides a simple apparatus for determining the square root of a number to the nearest integer. The method simply involves the subtraction of a numerical progression of numbers from the desired number and the counting of the number of subtractions performed to obtain the square root of the number. The apparatus of the invention is simple and includes two conventional binary counting means, one forward counting and the second backward counting, a coupling means and an inhibiting means. By placing the number in the backward counting means, pulsing the forward counting means and sequentially subtracting the output of the forward counting means from the backward counting means until the backward counter reaches zero or a negative number, the square root of the number originally in the backward counter is easily obtained.

The foregoing objects and many of the attendant advantages of this invention will become more readily appre-appreciated as the same becomes better understood by reference to the following detailed description when taken in conjunction with the accompanying drawings wherein.

Figure 1:
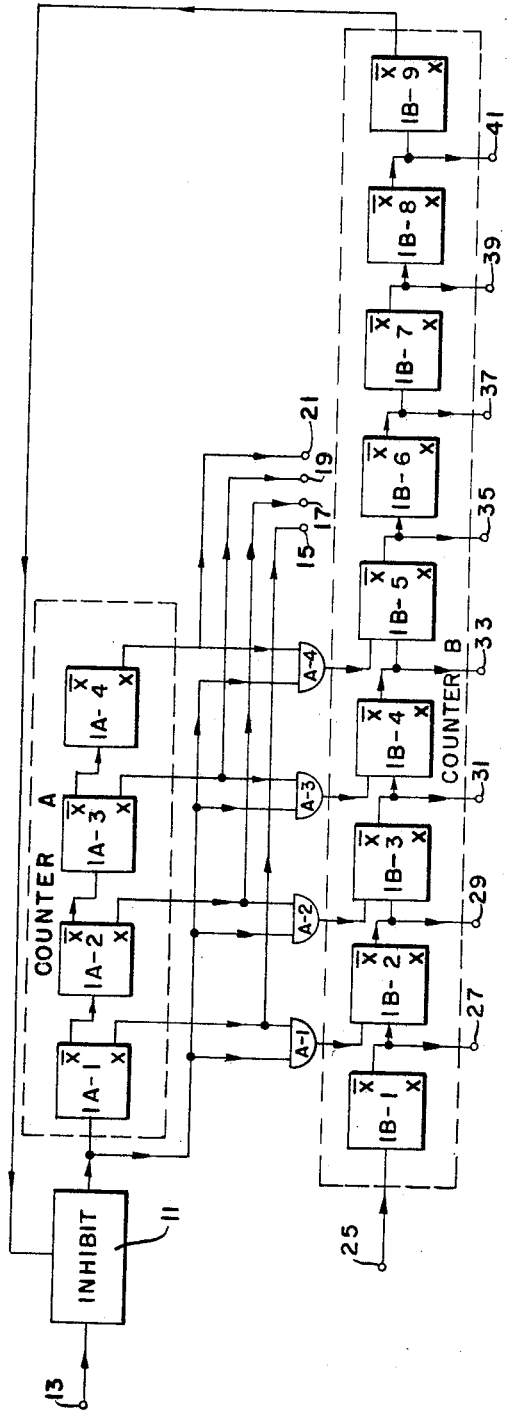
FIG. 1 is a block diagram illustrating the general form of the invention.

For ease of illustration, in the following description N represents the square root of the number M where both M and N are integers.

In accordance with the theory of the invention N approximately equals the square root of M provided that N satisfies the following relation $$\sqrt{M} - \frac{1}{2} < N \le \sqrt{M} + \frac{1}{2}$$

These inequalities may be rewritten separately as:

$$N \le \sqrt{M} + \frac{1}{2}$$

$$N > \sqrt{M} - \frac{1}{2}$$

The integer N that satisfies both of these equations may be determined by successively testing positive integers (starting at zero) until the correct integer is determined. In other words, for a specific M, integers can be substituted for N until the foregoing inequalities are satisfied. That integer will be the square root of M to the nearest integer.

Further, in accordance with another aspect of the invention's theory, by working from zero towards successively larger integers it is only necessary to satisfy the second inequality set forth above. That is, if an N is found that satisfies $$N > \sqrt{M} - \frac{1}{2}$$

as the value of the integers being tested increases by 1, then that integer necessarily satisfies the inequality $$N \le \sqrt{M} + \frac{1}{2}$$

Hence, in accordance with this aspect of the invention's theory, only the second inequality illustrated above is used.

In taking the square root, one starts with M rather than $\sqrt{M}$. The second inequality, which can also be written $$N + \frac{1}{2} > \sqrt{M}$$

can be expressed in terms of M rather than the $\sqrt{M}$, by squaring both sides. Specifically, if $$N + \frac{1}{2} > \sqrt{M}$$

then $$\left(N + \frac{1}{2}\right)^2 > M$$

must also be true.

$$\left(N + \frac{1}{2}\right)^2 \text{ equals } N^2 + N + \frac{1}{4}$$

Further, since M and N are both defined as integers, this expression is equivalent to $N^2 + N$. Hence, $N^2 + N > M$ is the equation used to find the $\sqrt{M}$, where N is equal to $\sqrt{M}$ to the nearest integer.

It is well known that a squared number can be made equal to a progression of numbers. Specifically, $$N^2 = 1 + 3 + 5 \ldots + (2N - 1).$$

More generally, $$N^2 = \sum_{K=1}^{N} (2K - 1)$$

Because $N^2$ can be described as a progression of numbers, $N^2 + N$ can also be described as a progression of numbers. Specifically, $$N^2 + N = 2 + 4 + 6 + \cdots + 2N$$

Or, more generally, $$N^2 + N = \sum_{K=1}^{N} 2K$$

To compute the square root of M it is necessary to successively subtract the terms of the series of $N^2 + N$ from M. For each integer N the result is $R = M - (N^2 + N)$. As long as R is positive $N^2 + N$ is less than M and that N is not the desired answer. However, after a sufficient number of N's have been subtracted from M some N causes R to be either zero or a negative number. It is this N that is equal to the $\sqrt{M}$ to the nearest integer.

Hence, in accordance with the invention, the square root of a number to the nearest integer can be obtained by performing the following steps on that number:

(1) sequentially subtracting a progression of numbers from the number whose square root is desired;

(2) detecting when one of the sequential subtractions causes the remainder to equal either zero or a negative number; and (3) counting the number of subtractions that have occurred when the remainder is zero or a negative number.

The number of subtractions is equal to N and, hence, is equal to the square root of the number M to the nearest integer.

Figure 3:
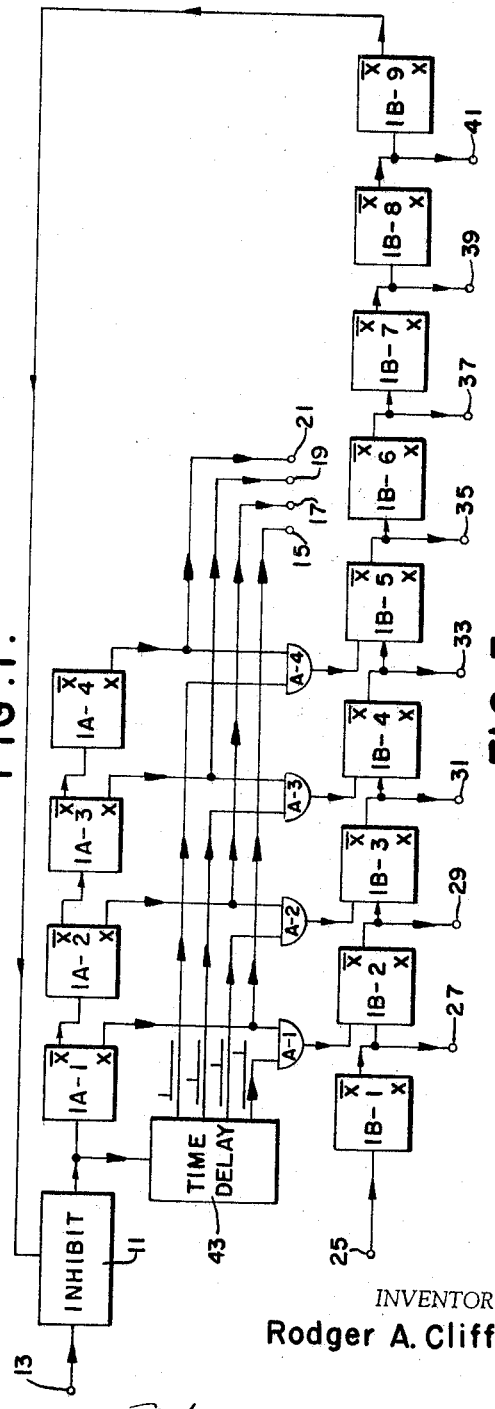
FIG. 3 is a block diagram illustrating a second embodiment of the invention.
Figure 2:
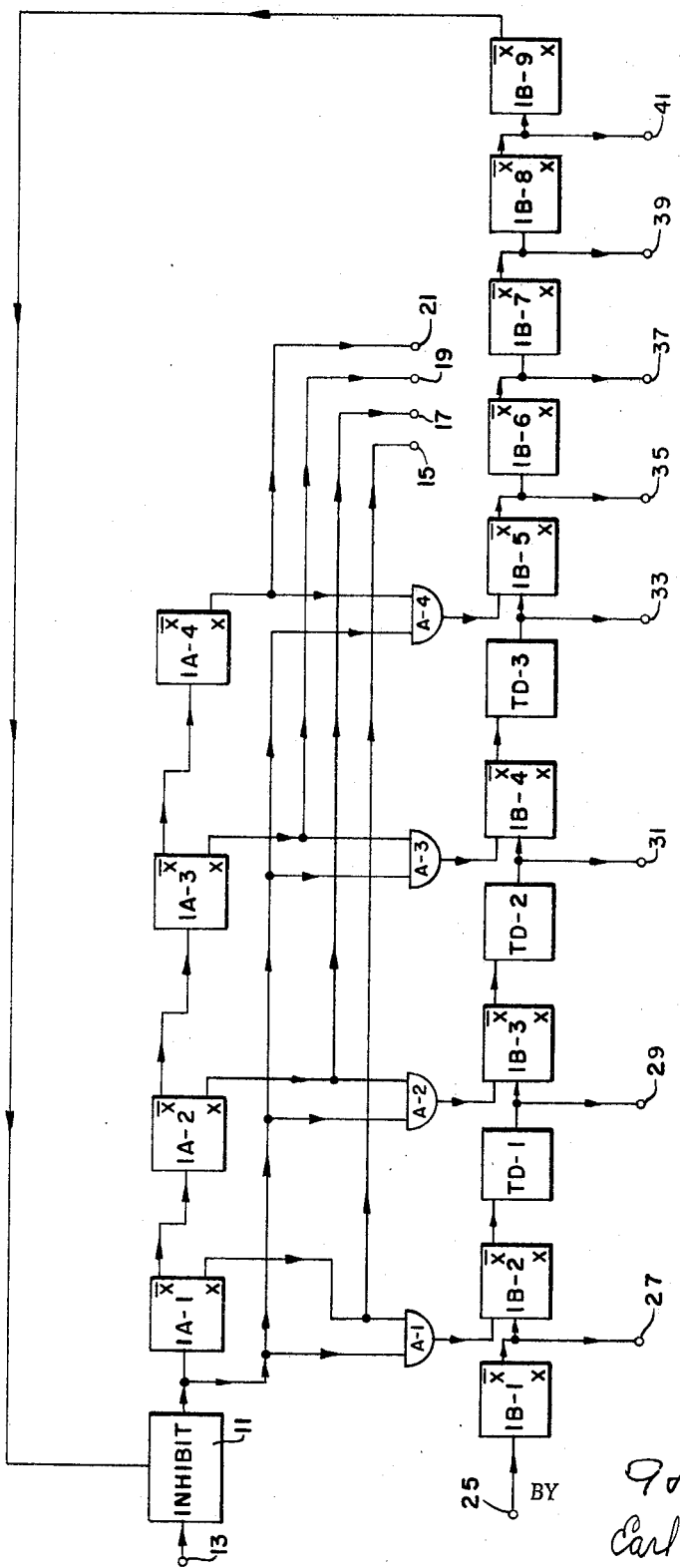
FIG. 2 is a block diagram more specifically illustrating one embodiment of the invention.

FIGS. 1, 2 and 3 illustrate embodiments of the apparatus of the invention that will perform the foregoing steps. For ease of discussion, all illustrated embodiments of the invention include a four-stage forward counter and a nine-stage backward counter. However, the four and nine stages are only by way of example and it is to be understood that any number of stages can be used depending upon the size of the numbers whose square roots are desired.

FIG. 1 comprises a forward binary counter designated as A with its four stages designated as 1A-1, 1A-2, 1A-3, and 1A-4; and a backward binary counter designated as B with its nine stages designated as 1B-1, 1B-2, 1B-3, 1B-4, 1B-5, 1B-6, 1B-7, 1B-8 and 1B-9. In addition to the counters, the apparatus illustrated in FIG. 1 includes an inhibit circuit 11, and a coupling circuit comprising four two-input AND gates designated as A-1, A-2, A-3 and A-4.

Each stage of the counter is a binary stage having a true and a complementary output designated as X and $\overline{X}$ respectively. As is well known in the art, when one output is a binary 1 the other output is a binary 0 and vice versa. Further, the outputs switch binary states for each 0 to 1 input transition, but not for a 1 to 0 transition.

An input terminal 13, adapted for connection to a pulse source, is connected to the input of the inhibit circuit 11. The output of the inhibit circuit is connected to the input of 1A-1 and through a time delay to one input of each of the four AND gates. The $\overline{X}$ output of 1A-1 is connected to the input of 1A-2; the $\overline{X}$ of 1A-2 is connected to the input of 1A-3; and the $\overline{X}$ output of 1A-3 is connected to the input of 1A-4. The X output of 1A-1 is connected to the second input of A-1; the X output of 1A-2 is connected to the second input of A-2; the X output of 1A-3 is connected to the input of A-3; and the X output of 1A-4 is connected to the second input of A-4. In addition, the X output of 1A-1 is connected to an output terminal 15, the X output of 1A-2 is connected to output terminal 17; the X output of 1A-3 is connected to an output terminal 19 and the X output of 1A-4 is connected to an output terminal 21. The output terminals, therefore, represent the outputs of the X sides of the A counter stages and, in the hereinafter description, are read from left to right. Because the outputs are taken from from the X side of the stages and because the $\bar{X}$ outputs of one stage are connected to the input of the subsequent stage the A counter is a forward counter.

The input of 1B–1 is connected to an input terminal 25. The $\bar{X}$ output of each lower order stage of the B counter is connected to the input of the next higher order stage of the B counter in the same manner that the A counter's stages are interconnected. Hence, the stage interconnection will not be more fully described.

The output of A–1 is connected as a separate input to 1B–2; the output of A–2 is connected as a separate input to 1B–3; the output of A–3 is connected as a separate input to 1B–4; and the output of A–4 is connected as a separate input to 1B–5. While the outputs from the AND gates are illustrated and described as separate inputs to their respective B counter stages they are not actually separate inputs. That is, in an actual embodiment of the device, isolation diodes are contained in the input lines from the previous stage and from the AND gates; however, the actual terminals of the inputs to the stages are at the same point. Hence, a 0 to 1 transition of either input operates to trigger a stage and change its state.

The $\bar{X}$ outputs of the B counter are connected to output terminals as follows: 1B–1 to 27; 1B–2 to 29; 1B–3 to 31; 1B–4 to 33; 1B–5 to 35; 1B–6 to 37; 1B–7 to 39; and 1B–8 is connected to terminal 41; while the $\bar{X}$ output of 1B–9 is connected to the inhibit input of the inhibiting circuit 11. Because the outputs of the B counter stages are taken from the $\bar{X}$ side and because the $\bar{X}$ side of a lower order stage is connected to the input of the next higher order stage, the B counter is a backward counter. That is, the B counter subtracts the numerical value of any particular stage from the number in the counter each time that stage is triggered. Specifically, each time stage 1B–1 is switched the decimal number 1 is subtracted from the number in counter B; each time 1B–2 is switched, the equivalent of a decimal 2 is subtracted; each time 1B–3 is switched a 4 is subtracted and so on through all nine stages of counter B.

The system illustrated in FIG. 1 operates to carry out the invention by subtracting from a number located in counter B the numerical progression 2+4+6, etc. That is, each time an input pulse is applied to counter A it subtracts the next number in the progression from the number then in counter B. Specifically, the first input pulse to counter A generates a 1000 at counter A's output terminals 15, 17, 19 and 21; however, this first pulse subtracts 2 from counter B because counter B is a backward counter and because the output of the first stage of counter A is connected to the input of the second stage of counter B. More specifically, when 1A–1 is triggered, its X output goes from 0 to 1. This passes through gate A–1 and triggers 1B–2 which is the second stage of counter B and corresponds in value to the decimal 2. Hence, a 2 is subtracted from counter B. When the second pulse is applied to counter A, 1A–1 shifts to its opposite state, i.e., its X output goes to 0 and its $\bar{X}$ output goes to 1. When the $\bar{X}$ output of 1A–1 goes to 1, 1A–2 is triggered so that its X output goes from 0 to 1 and its $\bar{X}$ output goes from 1 to 0. The 1 X output of 1A–2 is subsequently gated by A–2 and triggers 1B–3. 1B–3 is the third stage of counter B, corresponding to decimal 4; hence 4 is subtracted from counter B for the second pulse to counter A.

The systems illustrated in FIGS. 2 and 3 are similar to FIG. 1 and operate in a manner identical to the operation of that system. These systems, however, also include a time delay means. This is included because a switching pulse from both the previous stage and a switching pulse from an AND gate can be applied to a B counter stage at the same time to thereby create an error. That is, if A–2 and 1B–2 both presented a switch pulse to 1B–3 at the same time, 1B–3 would interpret them as a single input and would only switch once rather than twice, as it should. By providing suitable time delay systems of the type illustrated in FIGS. 2 and 3 this error can be prevented.

FIG. 2 is identical to FIG. 1 with the addition of a first time delay TD–1 between 1B–2 and 1B–3; a second time delay TD–2 between 1B–3 and 1B–4; and a third time delay TD–3 between 1B–4 and 1B–5. These time delays provide a "settle down" period between the application of pulses from the AND gates and the subsequent switching of higher order B counter stages by lower order B counter stages. The operation of FIG. 2 is otherwise identical to the operation of the FIG. 1 embodiment.

FIG. 3 is also identical to FIG. 1 with the addition of an alternative type of time delay system. In FIG. 3 a time delay system 43 is connected between the inhibit gate output and the inputs to the two input AND gates. The time delay system is connected so that, for each input pulse to terminal 13, a gating pulse is first provided to AND gate A–4, then to AND gate A–3, then to AND gate A–2 and finally to AND gate A–1. The time delay system, therefore, also prevents the simultaneous application of pulses to the B counter's stages by providing for a settle down time between the application of pulses from the AND gates and the application of pulses from lower order B counter stages to higher order B counter stages. Hence, as with the FIG. 2 embodiment, this time delay "settle down" period prevents errors.

Turning now to an example of the complete operation of the system illustrated in FIG. 2; assume the decimal number 59 is contained in register B. The decimal number 59 is represented by the binary number 110111000 at the output terminals of counter B, as read from left to right. This number can be placed in counter B, for example, by applying pulses to counter B's input terminal 25 until counter B's output terminals reached this binary number.

Prior to operation, counter A is cleared by means not shown so that all of its X outputs are equal to 0. When a first pulse is applied to input terminal 13 it passes through the inhibit gate and triggers the A counter stage 1A–1. The 1A–1 X output goes from 0 to 1 and the $\bar{X}$ output goes from 1 to 0. The X output of 1A–1 is subsequently gated through A–1 and triggers 1B–2. When 1B–2 is triggered its $\bar{X}$ output goes from 1 to 0; because its $\bar{X}$ output drops from 1 to 0 it does not trigger 1B–3 and at this point the B output is 100111000. This is equivalent to the decimal number 57. Hence, the first number in the progression—2—has been subtracted from the 59 originally contained in counter B.

The second pulse switches 1A–1 to its opposite state; that is, its $\bar{X}$ output goes from 0 to 1 and its X output goes from 1 to 0. The $\bar{X}$ output of 1A–1 then triggers 1A–2 to change its X output from 0 to 1 and its $\bar{X}$ output from 1 to 0. At this point the X outputs from the A counter at terminals 15, 17, 19 and 21 are 0100. The 1 output of 1A–2 is gated to 1B–3 by A–2 and triggers 1B–3. When 1B–3 is triggered its $\bar{X}$ output goes from 0 to 1. When its $\bar{X}$ output goes from 0 to 1 it triggers 1B–4 and the $\bar{X}$ output of 1B–4 goes from 1 to 0. The $\bar{X}$ output of 1B–4 does not trigger 1B–5 and hence the output at this point is 101011000; this is equivalent to the decimal number 53. Hence, the second number in the progression—4—has been subtracted from the previous 57 or an overall 6 has been subtracted from the initial 59.

When the third input pulse triggers 1A–1 its X output changes to 1 and the output from the A counter is 1100. Then the X output of 1A–1 is gated by A–1 to 1B–2 and triggers 1B–2 changing 1B–2's $\bar{X}$ output from 0 to 1. Also the 1 output of 1A–2 is gated by A–2 to 1B–3 and triggers 1B–3 changing 1B–3's $\bar{X}$ output from 1 to 0. The change of 1B–3's $\bar{X}$ output from 1 to 0 has no effect on 1B–4 or any of the following stages. However, the 0 to 1 change of 1B–2's $\overline{X}$ output now reaches 1B–3 through time delay of TD–1 and causes 1B–3 to change from a 0 to a 1. This second change in 1B–3 triggers 1B–4 to switch its $\overline{X}$ output to a 1. The 1 output of 1B–4 triggers 1B–5 to cause its $\overline{X}$ output to reduce to zero. At this point, the binary output of counter B is 111101000; this is equal to the decimal number 47. Hence, the third number in the progression—6—has been subtracted from 53.

The fourth pulse to counter A provides an output from counter A of 0010. This output in the manner described above triggers counter B so that it generates an output of 111001000. This binary number is equal to 39.

The fifth pulse provides an output of counter A that is 1010. This output passes through the AND gates to trigger the appropriate stages of counter B to cause counter B to generate an output of 101110000. This binary number is equal to the decimal number 29.

The sixth pulse provides an output from counter A of 0110. This output triggers counter B to generate an output of 100010000. This output is equivalent to the decimal number 17.

The seventh pulse to counter A changes its output to 1110. This output triggers counter B to generate a binary output of 110000000. This output is equivalent to the decimal number 3.

The eighth pulse triggers counter A to generate an output of 0001. This output triggers counter B to generate an output of 110011111. The first eight stages of this output represent a modulo $2^8$ negative number while the ninth stage merely detects whether a zero or negative number has been reached. Hence the $\overline{X}$ output of 1B–9 applies a signal to the inhibit input of inhibit circuit 11 to inhibit the further application of pulses to both the AND gates and the A counter.

Prior to the generation of the inhibit pulse, however, eight pulses were counted by counter A; hence, the closest numerical integer representing the square root of 59 is 8. A brief check with a slide rule or with a square root table determines that the square root of 59 is approximately 7.68. Hence 8 is the nearest integer to the square root of 59.

In conclusion, the system illustrated in FIG. 2 acts to subtract the sequence 2+4+6 etc. from the number contained in counter B until either a zero or a negative number is in counter B. This situation inhibits the further application of pulses through the inhibit gate 11 because the $\overline{X}$ output of stage 1B–9 becomes 1. The output from counter A at this point represents the square root of the number originally contained in the counter B to the nearest integer.

It will be appreciated by those skilled in the art and others that the invention provides apparatus for obtaining the square root of a number to the nearest integer. Specifically, the steps require the sequential subtraction of a progression of numbers from the number whose square root is desired. When the subtraction reaches either zero or a negative number the number of subtractions performed is equal to the square root. Further, the invention provides an equally simple apparatus for carrying out the method.

The apparatus includes two counters: one for counting up and the other for counting down. The forward counter sequentially subtracts numbers from the backward counter in a predetermined manner. When the backward counter reaches either zero or a negative number, the apparatus prevents further counting of pulses by the forward counter and the number of pulses counted by the forward counter at that point is equal to the square root of the number originally in the backward counter.

It will further be appreciated that the four stage upward counter and the nine stage backward counter are discussed only by way of example. Any number of stages for each counter can be used depending upon the size of the numbers whose square roots are desired. Similarly, the time delay means illustrated in FIGS. 2 and 3 are also only by way of example. Other suitable time delay means can be utilized to provide the same function. Moreover, it will be appreciated by those skilled in the art that the progression 2+4+6, etc. is only by way of example. Any progression that will suitably determine the desired result can be used.

Moreover, this invention can be used to take the square root of non-integer numbers. For example, suppose B is a $n$-ary number with less than $2P$ $n$-ary places in the fractional part, then $M=(n^{2P} \times B)$ is an integer and $N \approx \sqrt{M} = n^P \times \sqrt{B}$. Therefore, $\sqrt{B} \approx n^{-P} \times N$. Hence, the invention may be practiced otherwise than as specifically described herein.

What is claimed is:

1. Apparatus for computing the square root of a number comprising:
   a first binary means having a plurality of stages for counting pulses;
   a second binary means having a plurality of stages for storing a binary number;
   an inhibit means for inhibiting the application of pulses and having an input adapted for connection to a pulse source, an output connected to said first binary means and an inhibit input connected to said second binary means; and
   a coupling means for connecting the outputs of said plurality of stages of said first binary means to the inputs of predetermined stages of said plurality of stages of said second binary means.

2. Apparatus as claimed in claim 1 wherein said second binary means is a second binary counter and wherein the output of the last stage is connected to the inhibit input of said inhibit means.

3. Apparatus as claimed in claim 2 wherein said coupling means includes a plurality of AND gates each of which has at least two inputs, wherein one input of each AND gate is connected to the output of one stage of said first binary counter and a second input of each stage is connected to the output of said inhibit means and the output of each AND gate is connected to one stage of said second binary counter in a predetermined manner.

4. Apparatus as claimed in claim 3 wherein the output of each stage of said first binary counter is connected through an AND gate to the input of the next higher order stage of said second binary counter.

5. Apparatus as claimed in claim 4 including time delay means connected between predetermined stages of said second binary counter.

6. Apparatus as claimed in claim 4 including a time delay means connected between said inhibit means and the second input of said AND gates.

References Cited

UNITED STATES PATENTS 3,267,267    8/1966    Clark _____ 235—158 X

EUGENE G. BOTZ, Primary Examiner
R. S. DILDINE, JR., Assistant Examiner

U.S. Cl. X.R.

235—175